United States Patent [19]

Veta et al.

[11] Patent Number: 4,990,391
[45] Date of Patent: Feb. 5, 1991

[54] RETICULATED CORE TO PERFORATE SHEET BONDING AND GALVANIC BARRIER

[75] Inventors: Ross E. Veta, Carlsbad; Ernest C. Millard, Redlands, both of Calif.

[73] Assignee: Rohr Industries, Inc., Chula Vista, Calif.

[21] Appl. No.: 305,515

[22] Filed: Feb. 3, 1989

[51] Int. Cl.[5] .............................................. B32B 3/12
[52] U.S. Cl. .................................... 428/116; 156/292; 181/292; 244/117 R; 428/138
[58] Field of Search .................. 156/197, 292; 428/73, 428/116, 117, 118, 138; 244/117 R; 181/292

[56] References Cited

U.S. PATENT DOCUMENTS

| | | | |
|---|---|---|---|
| 4,254,171 | 3/1981 | Beggs et al. | 428/116 |
| 4,271,219 | 6/1981 | Brown | 428/116 |
| 4,291,079 | 9/1981 | Hom | 428/116 |
| 4,292,356 | 9/1981 | Whitemore et al. | 428/116 |
| 4,379,191 | 4/1983 | Beggs et al. | 428/138 X |
| 4,384,020 | 5/1983 | Beggs et al. | 428/116 X |
| 4,421,811 | 12/1983 | Rose et al. | 428/116 |
| 4,433,021 | 2/1984 | Riel | 428/116 |
| 4,465,725 | 8/1984 | Riel | 428/116 |
| 4,487,794 | 12/1984 | Brown et al. | 428/116 X |
| 4,504,346 | 3/1985 | Newsam | 156/290 X |
| 4,541,879 | 9/1985 | Riel | 156/292 X |
| 4,826,106 | 5/1989 | Anderson | 244/117 R |

Primary Examiner—Henry F. Epstein
Attorney, Agent, or Firm—Patrick J. Schlesinger; Frank D. Gilliam

[57] ABSTRACT

The invention is directed a laminate structure using a reticulated adhesive material positioned between the honeycomb core and a perforate sheet and a precured reticulated adhesive between the perforated sheet and an outer layer of wire screen or other porous fibrous materials with similar pore openings therethrough through which the cells of the honeycomb core can communicate the atmosphere adjacent to the opposite side of the outer layer of porous material and a method of manufacturing same. During the manufacturing process of honeycomb noise attenuation structures which includes an imperforate sheet, an open cell honeycomb core, a perforated sheet and a layer of porous material stacked in that order a thin sheet of a reticulative adhesive material is positioned between the honeycomb core and perforated sheet and between the perforated sheet and the outer porous layer. During reticulation the reticulative material by its physical makeup shrinks to the edges of the perforations of the perforated sheet thereby leaving the perforations of both sheets of material open to the cells providing a bonding agent between the honeycomb core and perforated sheet and a similar precured layer providing galvanic isolation between the porous sheet and the perforated sheet.

10 Claims, 1 Drawing Sheet

RETICULATED CORE TO PERFORATE SHEET BONDING AND GALVANIC BARRIER

BACKGROUND OF THE INVENTION

This invention is directed to an improved laminated noise attenuation structure and more particulary to a noise attenuation structure with a centrally positioned honeycomb core having an imperforate sheet of metal adhesively bonded to one surface and a perforate sheet of metal adhesively bonded to the opposite surface with a layer of metal woven or fibrous material of a metal different from the perforated sheet adhesively bonded to the outer surface of the perforated sheet whereby the laminate has a predetermined flow through resistance between the cells of the core and the outer surface of the porous material and galvanic action between the dissimilar metals of the perforated sheet and porous material is prevented.

Typical sound attenuation material of the type described herein is taught by U.S. Pat. Nos. 4,254,171; 4,379,191; and 4,384,020By Stanley L. Biggs, et al. and U.S. Pat. No. 4,421,811 by inventor Philip M. Rose, et al. all of which are assigned to the assignee of this invention. Sound attenuation structures taught by the above referenced patents have found wide acceptance for use in noise attenuation or suppression in the aircraft industry and are currently in great demand.

The prior art products noted above have proven to be highly successful for the use intended.

It has been found that in the current attenuation structures some of the perforations of the perforated sheet become undesirably plugged due to the adhesive material bonding the perforated sheet the honeycomb core flowing along the surface of the perforated sheet. Further in severe environmental conditions the normal expected life of the attenuation material is shortened due to galvanic action between the perforated sheet and outer porous layer of dissimilar material.

This invention is specifically directed to further improvements in acoustic laminate material to provide a more accurate predetermined feed through resistance between the outer surface of the porous material and the cells of the honeycomb core and to extend the normal life of the laminate in severe environmental conditions such as those conditions normally encountered in the South Pacific area and other like environmental areas.

Until the emergence of the instant invention there has not been a satisfactory means for providing enchanted attenuation laminate material with elimination of galvanic action between dissimilar metals during drilling, or cutting, without destroying acoustic characteristics within that area.

SUMMARY OF THE INVENTION

The invention is directed to the improvement of attenuation laminates used in silencing the engine noise of modern day aircraft. The improvements comprise the use of a reticulative layer of adhesive between the honeycomb core and the perforated sheet and precured reticulated adhesive between the perforated sheet and the outer layer of porous material. During reticulation the reticulative adhesive material tends to create voids in open areas and collect along the edges of the perforations in the perforate sheet rather than flow along the surface of the perforated sheet closing the perforations or flowing into the pores of the porous material changing the expected flow through resistance of the laminate structure.

It is an object of this invention to provide an improved galvanic barrier between the dissimilar metals of construction in acoustic laminates used as aircraft noise attenuation structures.

Another object of this invention is to provide a laminate sound attenuation structure with a more accurately predetermined flow through resistance between the outer surface of the porous material and the cells of the honeycomb core.

These and other objects of the invention will become better understood by reference to the following description when considered with the drawing Figures, in which:

BRIEF DESCRIPTION OFF THE DRAWING FIGURES

DETAINED DESCRIPTION OF THE INVENTION

Figure 1:
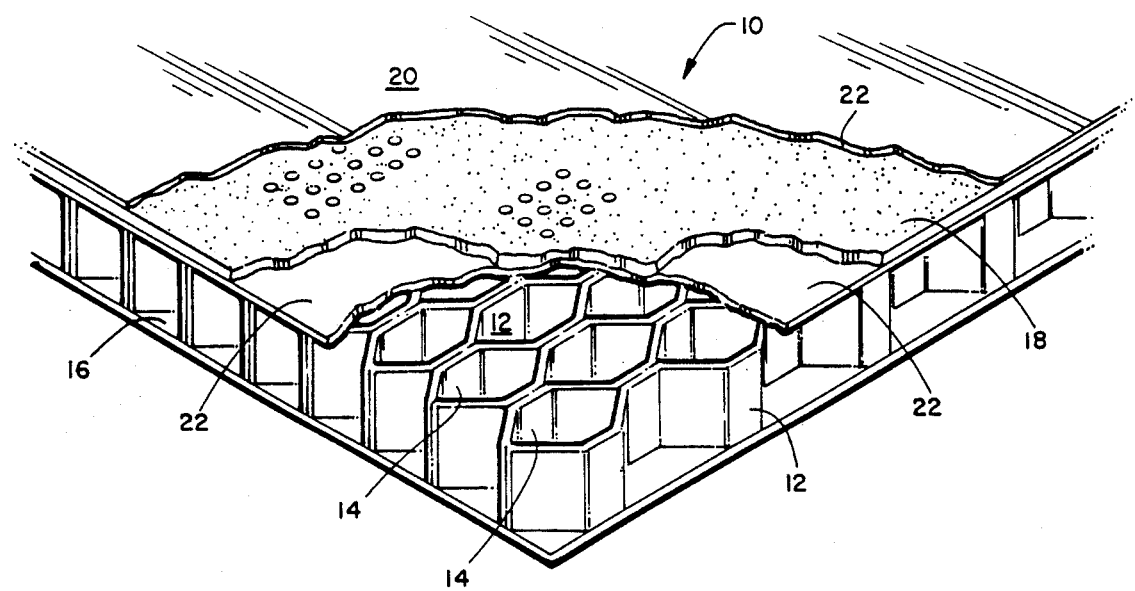
FIG. 1 is a perspective view of an acoustic laminate structure showing the position of the two layers of reticulative adhesive material.

Referring now to the various drawing Figures, The acoustic laminate panel 10 of the invention comprises a honeycomb core 12, having endwise directed cells 14 which are enclosed by a imperforate sheet of material 16 and a perforate sheet 18. The outer sheets and core are generally constructed of aluminum, composite or other light weight material suitable for use as aircraft structure. The outer surface of the perforated sheet 18 has a layer of porous material 20 bonded thereto. The layer 20 can be formed from a woven or felt metal material constructed from stainless steel or the like. This layer is not normally constructed from the same material as the honeycomb core or sheets 16 and 18, i.e. the outer layer 20 and core and sheets are constructed from dissimilar metals.

Figure 2:
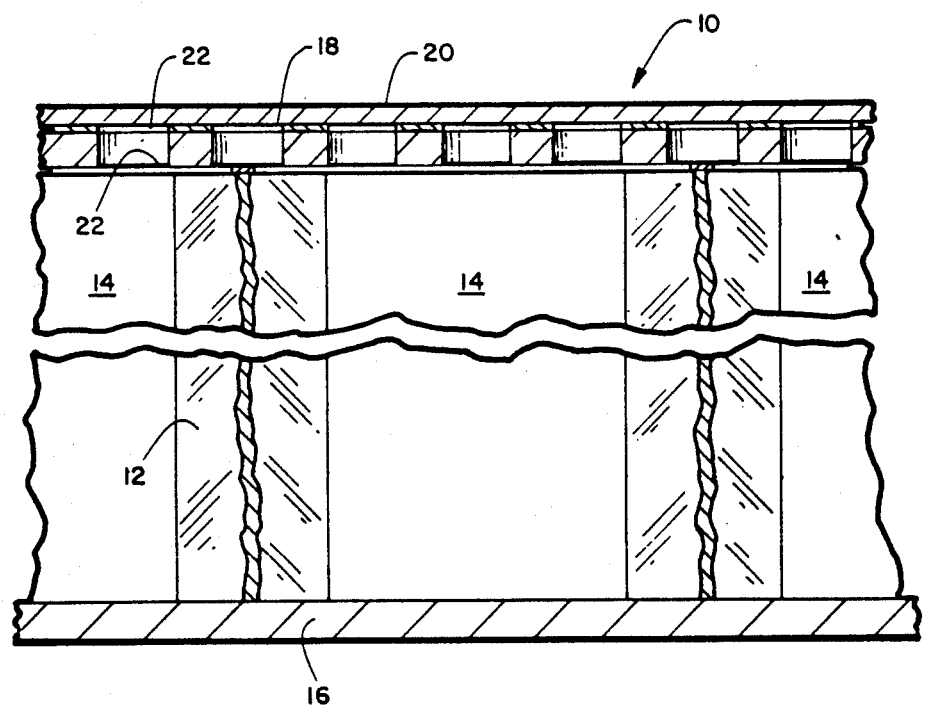
FIG. 2 is a fragmentary vertical section of the acoustic laminate of FIG. 1.

As is shown in the drawing FIGS. 1 and 2, the laminate 10 is formed by stacking a first imperforate sheet 16, then the honeycomb core 12, then the perforate sheet 18 and the porus material 20 on the outer surface of the perforated sheet 18. Placed at least between the perforated sheet 18 and the honeycomb core 12 is a thin sheet of a reticulative adhesive medium 22 preferably epoxy based or an equivalent type material which is generally cured in place. The same type of adhesive may also be positioned between the perforated sheet 18 and the layer of porous material which may be cured in place as discussed above but is generally articulated and precured before application of the porus material onto the perforated sheet then the porous material is adhered to the perforated sheet by adhesive means . The imperforate sheet 16 can be adhered as set forth in the above referenced patents.

When heated to molten the reticulative adhesive material 22 has a reduction in surface tension making the surface of the adhesive weak creating surface voids across the perforations of the perforate sheet. To take advantage of these weak surface areas air is passed through the cells, perforations of the perforate sheet material causing the reticulative material to be attracted to the adjacent solid areas, i.e. edges of the perforations, clearing the spaces across perforations. This precured adhesive accumulation causes a thickness build up between the perforate sheet and edges of the pores of the porous material which allows sizing or trimming of the finished laminated with out fear of causing a physical connection between the dissimilar metals of the perforate sheet and the porous material.

The clearing of the porous and perforations of the completed laminate structure insures that the predicted flow through resistance can be maintained through the manufacturing process even if sizing of the laminate by sheering or cutting is required.

The imperforate sheet can be adhered to the faying edges of the honeycomb core either during the curing of the reticulative adhesive material or after the cure of the reticulative material between the perforate sheet and porous material, depending on the method utilized to clear the reticulative adhesive material from the perforations.

The resulting product has a calculatable flow through resistance and has electrical isolation between the dissimilar metals of the perforate sheet and the porous material thereby preventing galvanic action therebetween.

What is claimed is:

1. A method for producing acoustical honeycomb sandwich laminate panel for use as supporting structure for an aircraft for sound suppression wherein said acoustic honeycomb sandwich laminate panel is exposed to the element and engine sounds comprising the steps of:
    providing a honeycomb core having a plurality of open cells defined by edgewise directed walls positioned transverse to the surface of said panel;
    providing a thin sheet of perforated facing material for bonding to one the faying edge surface of said honeycomb core;
    providing a thin layer of porous material for bonding to the other surface of said thin sheet of perforated material;
    positioning said thin sheet of perforated material between said honeycomb core and said thin layer of porous material;
    bonding together said honeycomb, perforated facing material, thin layer of porous material comprising the steps of,
    positioning a thin sheet of a reticulative adhesive material between said honeycomb core and said perforated sheet,
    heating said thin sheet of reticulative adhesive to a molten state,
    passing air through said cells, perforated sheet and pores of said thin layer of porous material thereby causing the reticulative material to be attracted to the solid areas of said perforated sheet clearing the perforations of said reticulative material;
    providing a thin sheet of imperforate material; and
    bonding said thin sheet of imperforate material to the other faying edge of said honeycomb material.

2. The method as defined in claim 1 additionally comprising the step of positioning a thin sheet of said reticulative material between said thin sheet of perforated material and said thin layer of porous material prior to the step of heating the reticulative material.

3. The method as defined in claim 1 wherein said layer of thin reticulative material has a thickness in the range of 0.05 to 0.07 inches.

4. The method as defined in claim 2 wherein said layer of thin reticulative material has a thickness in the range of 0.05 to 0.07 inches.

5. The invention as defined in claim 1 wherein said reticulative material is epoxy based.

6. The invention as defined in claim 2 wherein said reticulative material is epoxy based.

7. The method as defined in claim 1 including the step of precuring said thin sheet of reticulative material prior to the step of heating said reticulative material.

8. The method as defined in claim 2 including the step of precuring said thin sheets of reticulative material prior to the step of heating said reticulative material.

9. A laminated structure resulting from the method of claim 1.

10. A laminated structure resulting from the method of claim 2.

* * * * *